United States Patent Office 3,533,970
Patented Oct. 13, 1970

3,533,970
COATING COMPOSITIONS FOR
PROPYLENE POLYMER
Kazuyuki Mihara, Yokohama-shi, Japan, assignor to
Mitsubishi Petrochemical Co., Ltd., Tokyo, Japan
No Drawing. Continuation-in-part of application Ser. No.
488,770, Sept. 20, 1965. This application Apr. 16, 1968,
Ser. No. 721,586
Claims priority, application Japan, Sept. 21, 1964,
39/53,582
Int. Cl. C08c 13/00
U.S. Cl. 260—5
15 Claims

ABSTRACT OF THE DISCLOSURE

A coating composition for propylene polymer comprising a petroleum resin, a cyclorubber and a solvent therefor. The petroleum resin is a polymer of unsaturated hydrocarbon obtained by the cracking of petroleum oils.

CROSS-REFERENCE TO RELATED APPLICATION

The present application is a continuation-in-part application of my copending U.S. patent application Ser. No. 488,770, filed Sept. 20, 1965, now abandoned.

BACKGROUND OF THE INVENTION

Field of the invention

The present invention relates to novel and useful coating compositions for propylene polymer, more particularly to coating compositions suitable for painting or printing on the surface of shaped articles of, or substantially of propylene polymer, and to a novel process for applying these coating compositions to said article and further to the novel compositions produced thereby.

Description of the prior art

Inasmuch as polypropylene is highly nonpolar as well as crystalline in nature, conventional coating compositions do not adhere to the surface thereof, therefore, painting or printing on the surface of polypropylene has been extremely difficult and as a result, the use of polypropylene is considerably restricted at present.

Therefore, in order to improve the adhesion of coating composition to the surface of polypropylene, various pretreatments of the surface of polypropylene, for instance, oxidation by means of flame projection, ozone gas, corona discharge, or hot bichromate-sulfuric acid followed by painting or printing on the resulting polar surface have been heretofore proposed. However, it is almost impossible to obtain secure adhesion of coating compositions to the surface of polypropylene satisfactorily for practical purposes with these methods known heretofore. Also, many attempts have been made to improve the adhesive properties of coating compositions by etching the surface of polypropylene with solvent which ended in vain effort. The reason is that the chemical resistance and the solvent resistance of polypropylene are too good to be etched by such solvents.

Further, as an alternative method for improving the adhesive properties of polypropylene, a mixture comprising polyethylene having low polymerization degree and fatty acid or resin, or a solution of cyclorubber as a vehicle for a coating composition as disclosed in Belgian Pat. No. 632,090, were invented, however, these vehicles are too sticky to be handled easily and the adhesive strength to the polypropylene obtained thereby is not satisfactory enough to be readily practised.

SUMMARY OF THE INVENTION

Accordingly, an object of the present invention is to provide a novel painting or printing composition which adheres strongly to the surface of propylene polymer without requiring any troublesome pretreatment thereof as described above. A further object is to provide a novel painting or printing composition suitable for applying to the cleaned surface of propylene polymer to form a coating or printing film securely adhered thereto.

Still another object is to provide a process for forming a coating or printing film securely adhered to the surface of propylene polymer by applying a coating composition thereto without requiring any pretreatment.

Yet another object is to provide a shaped article of propylene polymer to be obtained by applying a novel coating composition of the present invention.

These and other objects, and attendant advantages, will become apparent from the following description of the present invention.

I have now found that petroleum resins exhibit extremely good adhesive strength to propylene polymer, and when used in combination with cyclorubber, a coating or printing composition having surprisingly high adhesive strength to the surface of propylene polymer may be obtained by the synergistic effect resulting from the use of both petroleum resins and cyclorubber.

In accordance with the present invention, there is provided a coating composition which may adhere to propylene polymer base extremely strongly, comprising petroleum resin, cyclorubber and solvent therefor and, if desired, a further colorant such as pigments, or other additives.

The petroleum resins referred to and used in the present invention are generally defined as thermoplastic hydrocarbon resins having a softening point of 60–150° C. and bromine number of 26–60, produced by polymerizing a highly unsaturated liquid fraction of petroleum oil containing olefins and diolefins and having a boiling point of 20–280° C., as obtained in the refining and/or cracking of petroleum oil, since it is difficult to describe the chemical composition accurately with the present day analysis technique. The softening point referred to above is measured according to the method prescribed in JIS K–2531, and the bromine number is determined according to ASTM D1158–57T.

The petroleum resins referred to and used in the present invention are clearly distinguishable from various purified hydrocarbon resins such as polystyrene, polyolefin, paraffin wax, terprene resin, etc., in that they have unsaturated bonds corresponding to the bromine number of 20–60 as described above. That is, the purified hydrocarbon resins mentioned above are completely useless in the present invention.

The petroleum resins may be prepared from the cracked oil as produced in the steam-cracking of fractions of petroleum oil such as kerosene, gas oil and naphtha. This cracked oil usually has a boiling range of 20–280° C. and consists of 10–35% of diolefins, 40–70% of olefins, 20–45% of aromatics and 0–20% of paraffins and naphthenes.

In the present invention, among various petroleum resins, any one of these having a melting point of from 60° C. to 150° C. may be used, and particularly those having a melting point of from 80° C. to 130° C. give the most satisfactory results.

The petroleum resins which may be used particularly preferably in the present invention are thermoplastic hydrocarbon resins produced by copolymerizing a fraction containing styrene and styrene derivatives and having a boiling range of between about 140° and 280° C. with with a fraction containing diolefins and having a boiling range of between about 20° C. and 80° C. in the presence of Friedel-Crafts catalyst. For example, Petlite (Product of Mikuni Jushi Kagaku Co., Ltd., Japan), and Petrosin (Product of Mitsui Petrochemical Co., Ltd., Japan) are useful.

Petlite is produced by copolymerizing a fraction containing $C_5$ diolefin having a boiling point of 20–100° C. obtained from a thermal cracked oil of a petroleum fraction with a fraction containing styrene having a boiling point of 140–280° C. obtained from the same in the presence of boron trifluoride as a catalyst. This is the petroleum resin obtained according to the process described in British Pat. No. 980,965.

Petrosin is produced by polymerizing a fraction having a boiling point of 20–300° C. obtained by a thermal cracking of a petroleum fraction in the presence of a Friedel-Crafts type catalyst. A description is found in Japanese patent publication No. 27,867/1964.

The cyclorubbers used in the present invention are partialy cyclized raw rubbers which are characterized by a higher melting point than those of raw rubbers and high resistance to oxidative decomposition due to the decrease in the number of double bonds. They include monocyclorubbers obtained by heating rubber hydrochloride with zinc dust in toluene solution and polycyclorubbers obtained from reaction described above in the presence of hydrochloric acid, and also include cyclorubbers produced by using stannic chloride, ferric chloride, sulfuric acid, p-toluene sulfuric acid, boron trifluoride, etc., as an isomerizing agent.

In the present invention, among these cyclorubbers, any of those having a softening point of from 40° C. to 60° C., and an iodine number in the vicinity of from 160 to 185 may be used, and particularly those having a softening point of from 55° C. to 56° C., and iodine number of about 182 are preferable. Especially the product obtained by heating raw rubber under refluxing toluene, xylene or other solvent in the presence of a mixed catalyst of from 0.5 to 1% by weight per part of raw rubber, said mixed catalyst comprising stannic chloride and ferric chloride in a ratio of 1:1, is most preferable.

In the process of the present invention, the cyclorubber is used from 0.8 to 1.2 parts by weight per part by weight of petroleum resin.

In the practice of the present invention, a lustrous coating film of high adhesive strength is obtained by dissolving the petroleum resin and cyclorubber in the solvent and painting the resultant viscous solution as it is, and said coating film serves to decrease gas permeability of the propylene polymer base on which it is formed. Usually, colorants such as pigments or oil soluble dyestuffs, ultraviolet absorbers or thixotropic agents may be mixed therewith to form a colored painting or printing film strongly adhered to propylene polymer base.

The addition of a solution of resin or unsaturated fatty acid modified alkyd resin in xylene and a drying agent such as metal salts of naphthenic acid to the coating compositions of the present invention provides for easier painting or printing, however, in this case, there is required a relatively longer drying period; from 5 to 7 hours for complete drying. In this case, the amount of metal salts of naphthenic acid and 50% solution of unsaturated fatty acid modified alkyd resin in xylene are preferably from 2 to 10% by weight, from 1 to 40% by weight, respectively, based on the total weight of the composition.

Upon painting or printing the coating compositions of the present invention, various aliphatic hydrocarbons, halogenated aliphatic hydrocarbons, aromatic hydrocarbons, etc., having boiling points of about 90° C. to 200° C. may be used as solvent, however, light oil, mineral turpentine, benzene, toluene, xylene and isophorone are most preferable.

The coating compositions of the present invention may be applied to a propylene polymer base by conventional methods such as brushing, spraying, etc., and in case of printing, conventional methods such as screen process printing, rotary photogravure printing, letterpress printing, etc., may be employed.

The films formed by coating or printing of the coating composition adhere to propylene polymer base so strongly as described in the following examples that it is impossible to peel them off by any test methods.

Considering the fact that heretofore there has never been a way of adhering coating compositions to propylene polymer base strongly enough, the advantages brought about by the present invention are of extremely great significance in that they substantially increase the possibility of use of propylene polymer in many fields.

The propylene polymer to which the coating composition is applicable includes shaped articles derived from propylene homopolymer, copolymer containing a major proportion of propylene, and mixtures consisting of major portion of these homopolymer and/or copolymer and other substances.

The reason as to why the coating compositions of the present invention adheres so strongly to nonpolar polypropylene polymer base has not yet been completely understood.

The present invention will be better understood by referring to the following examples. However, it should not be construed that these examples restrict the present invention in any event, inasmuch as many apparently widely different embodiments of the present invention may be made without departing from the spirit and scope thereof.

The test methods employed in the examples are as follows:

CROSSHATCHING TEST

Eleven lines spaced at 1 mm., the depth of said lines extending through the coating to the polypropylene base are scratched in the longitudinal and transverse directions on a coating film with a sound-needle thereby forming a grill containing 100 squares to examine the conditions under which the coating peels off. The number of squares which are not peeled off by said scratching is indicated as the numerator while the total number of squares is the denominator, accordingly, 100/100 shows a condition wherein no peeling off takes place at all.

ADHESIVE TAPE TEST

An adhesive tape is contacted securely on said scratched grill, then, said adhesive tape is forcibly pulled upwardly at one end thereof. After that, the extent of peeling off is examined. The number of squares which are not peeled off by this test is indicated as numerator while the total number of squares is the denominator, accordingly, 100/100 indicates that none of these squares is peeled off.

FLEXIBILITY TEST

A test piece is bent around the radii of a round bar of ½ inch diameter at radius of 180°, and the test piece is examined for the presence of cracks. The test results are stated in terms of the length of any such cracks.

Example 1

A cyclorubber obtained by heating natural rubber at a temperature of 100° C. to 150° C. in the presence of a mixed catalyst of ferric chloride and stannic chloride, which cyclorubber is pale yellow in color and has a specific gravity of 1.05, reflective index of 1.54, ash content of 1.56%, iodine number of 183, chlorine content of 1.21% and softening point of 53° C. to 55° C., is dissolved in toluene to make a 25% solution of translucent yellowish brown.

Next, a petroleum resin which is a copolymerized resin derived from styrene, p-vinyltoluene, m-vinyltoluene, o-vinyltoluene, indene, etc., having a softening point of 120° C. to 122° C., specific gravity of 1.03, acid number of 0.14, saponification value of 0.84, iodine number of 38.7 and bromine number of 40.0, is dissolved in toluene to make a 60% solution of transparent yellowish brown.

A mixture of 70 to 80% of the cyclorubber solution and 20 to 30% of the petroleum resin solution, after being sufficiently mixed, is painted by means of spraying on the surface of polypropylene which is cleaned by washing with toluene, and dried. The coating film is dried within 5 to 10 minutes at an ambient temperature to such an extent that no finger-prints will remain on the surface thereof when touched by the tip of a finger, and if dried at temperature of 50° C. to 60° C., a lustrous and transparent coating film having extremely excellent adhesive strength is obtained. The properties of said coating film are as follows:

Crosshatching test result: 100/100, no change.
Adhesive tape test result: 100/100, no change.

(1) Unaffected by methanol, ethanol, butanols, propanols, ethyl Cellosolve, butyl Cellosolve, at ambient temperature.
(2) Swelled and whitened by acetone. Swelled by methyl ethyl ketone, methyl i-butyl ketone and cyclohexanone.
(3) Swelled and whitened by ethyl acetate and butyl acetate.
(4) Readily dissolved by toluene, xylene, gasoline, ligroin and carbon tetrachloride.
(5) Luster disappeared in 15% aqueous hydrochloric acid at ambient temperature in 240 hours. However, the coating film remained unaffected.
(6) Unaffected by 15% aqueous caustic soda for more than 500 hours.
(7) Unaffected by 15% aqueous ammonia for more than 500 hours.
(8) Unaffected by 10% aqueous sodium chloride for more than 500 hours.
(9) Softened by 30% aqueous acetic acid in 16 hours.
(10) Luster disappeared in boiling water in 30 minutes and deteriorated in 2 hours.
(11) Weathering test revealed disappearance of luster and deterioration of coating in three months' outdoor exposure, due to the lack of antioxidant.

Example 2

This example describes the manufacture of a white enamel as one embodiment of the manufacture of colored enamels.

| | Parts by weight |
|---|---|
| White pigment (rutile type titanium dioxide) | 25.0 |
| Ultramarine | 0.3 |
| Zinc white | 1.5 |
| Dispersing agent for pigment | 0.2 |
| 60% solution of petroleum resin in xylene | 20.0 |
| 25% solution of cyclorubber in xylene | 10.00 |

A mixture of the above-mentioned ingredients is kneaded four times into a paste by a three roll mill and a varnish of the following composition is added to the paste and the entire mixture was stirred well:

| | Parts by weight |
|---|---|
| Cyclorubber (25% solution in xylene) | 45.0 |
| 1% solution of silicone in xylene | 0.5 |
| 50% solution of di-tert-butyl hydroxytoluene in xylene as antioxidant | 2.7 |

The above mixture is filtered before use.

Coating composition prepared by mixing 100 parts of paint of the above-mentioned composition with 100 parts of toluene is sprayed on the polypropylene plate the surface of which is cleaned by toluene, to form a coating film of from 20 to 25 microns in thickness, and dried for 10 minutes at a temperature of 60° C. to 70° C. The properties of the coating film thus formed are as follows:

Crosshatching test result: 100/100, unchanged.
Adhesive tape test result: 100/100, unchanged.

The other chemical properties are the same as indicated in Example 1 except for weathering resistance which is improved to withstand deterioration for more than 5 months due to the addition of antioxidant.

COMPARISON TEST WITH OTHER COMMERCIALIZED PRODUCTS

In any foreign or domestic products available on the market, coating film thereof peeled off during the crosshatching test, as well as the adhesive tape test.

Even with oxidizing pretreatment of polypropylene by immersing said material in a mixed solution of potassium bichromate and concentrated sulfuric acid at a temperature of 100° C. for 10 minutes followed by washing in water for 3 hours, said crosshatching test of these commercially available products revealed figure of 0/100 i.e., a complete lack of adhesiveness.

Example 3

In this example, one embodiment of the manufacture of printing ink is as follows:

| | Parts by weight |
|---|---|
| Carbon black | 4.0 |
| 50% solution of copper oleate in xylene | 0.7 |
| Silicic acid gel | 6.5 |
| 70% solution of petroleum resin in mineral turpentine | 19.0 |
| 25% solution of cyclorubber in mineral turpentine | 10.0 |

A mixture of the above composition is kneaded sufficiently by a three roll mill five times into a paste, and by adding the following varnish mixture, the desired printing ink is obtained in the form of a paste:

| | Parts by weight |
|---|---|
| 25% solution of cyclorubber in mineral turpentine | 55.0 |
| 1% solution of silicone in xylene | 0.3 |
| 50% solution of di-tert-butyl hydroxy-toluene in xylene as antioxidant | 3.2 |
| Isophorone | 5.0 |

The printing ink described above facilitates easy printing on the surface of polypropylenic shaped article by means of any printing apparatus for silk-screen process printing, photogravure printing, and relief printing. The physical and chemical properties of the film are the same as in Examples 1 and 2.

Example 4

The further addition of atactic polypropylene, an isomeric polymer, which is a by-product in the preparation of crystalline polypropylene, to the compositions described in Examples 1 through 3 in the form of a 30% solution thereof in xylene also produces excellent adhesiveness.

Example 5

The further addition of a solution of chlorinated rubber in xylene to the compositions of Examples 1 through 4 is extremely effective in improving the luster and drying properties. Still further addition of from 1 to 10% of dibutyl phthalate or dioctyl phthalate provides quick drying and increased flexibility.

Example 6

The further addition of from 1 to 10% of a 50% solution of rosin modified phenol resin to the compositions of Examples 1 through 5 produces excellent acid resistance as indicated in the following table:

| Examples 1 through 5 | | Example 6 |
|---|---|---|
| 15% aqueous hydrochloric acid | Luster disappears in 240 hours | Unaffected for more than 800 hours. |
| 15% aqueous sulfuric acid | Luster disappears in 100 hours | Do. |
| 30% aqueous acetic acid | Softened in 16 hours | Softened in 200 hours. |

NOTE.—The above tests were conducted by immersing coated articles in the acid at a temperature of 20° C. to 25° C.

Example 7

The instant example shows that the coating composition obtained by mixing the petroleum resin and cyclorubber in a specific proportion as set forth according to the present invention has superior adhesive strength, luster, hardness and abrasion resistance over the other coating compositions known heretofore.

(I) MATERIALS USED FOR EXPERIMENTS

(1) Petroleum resin

"Petrosin," tradename, product of Mitsui Petrochemical Co., Ltd., Japan, of the following types:

(A) Sample No. 120
(B) Sample No. 100
(C) Sample No. 80

The properties of these samples used are as follows:

| Item | Softening point, ° C. | Color index, Gardner | Acid value, KOH mg./g. | Saponification value, KOH mg./g. | Bromine number, g./100 g. |
|---|---|---|---|---|---|
| Method of measuring | JIS K-2531 | ASTM D-154-58 | JIS K-5902 | JIS K=5902 | ASTM D1158-57T |
| Sample (A) | 120(±2) | Below 12 | Below 0.1 | Below 1 | 20-40 |
| Sample (B) | 100(±5) | Below 13 | do | do | 20-40 |
| Sample (C) | 80(±5) | do | do | do | 20-40 |

These three types of petroleum resins were dissolved in xylene and used as a 60% solution.

(2) Cyclorubber

A product of Seiko Kagaku Co., Ltd., Japan. The properties are as follows:

Specific gravity (20° C.) _____ 1.54
Ash content (percent) _____ 1.56
Iodine number _____ 183
Chlorine content (percent) _____ 1.21
Melting point (° C.) _____ 53-55

The cyclorubber forms a hard film when dried. This material was dissolved in xylene and used as a 25% solution.

(3) Gum rosin, coumarone resin, rosin ester gum, hardened rosin, novolak-phenol resin. (Products of Arakawa Rinsan Co., Ltd., Japan)

These materials were dissolved in toluene and used as a 50% solution.

(II) BASIS OF EVALUATION ON ADHESIVE STRENGTH AND COATING FILM

The following tests were performed on a test piece of shaped polypropylene resin by washing the surface once sufficiently with trichlene, drying the same, spraying the coating compositions as specified in Table 1 thereonto, heating at 60-70° C. for 10 minutes and drying the same.

(1) Adhesive strength

Eleven lines spaced 1 mm. apart which are deep enough to reach the polypropylene resin base are nicked in the longitudinal and transversal directions on coating film with a razor blade thereby forming a grille containing a hundred squares. An adhesive tape having a width of 24 mm. is pressed hard thereonto. Then, the adhesive tape was forcibly pulled abruptly at an angle of 30° with respect to the plane of the coating film to peel off the coating film. Then, the peel-off condition was indicated as follows:

All squares completely peeled off _____ X
50 squares out of 100 peeled off _____ 50/100
10 squares out of 100 peeled off _____ 90/100

(2) Coating film

Luster.—Photoelectric reflectivity at an angle of 60°, measured according to JIS K-5400 or ASTM D-523.

Hardness.—Pencil hardness as examined by using a Mitsubishi Uni pencil, tradename, product of Mitsubishi Pencil Co., Ltd., Japan, measured according to JIS K-5651-52.

Abrasion-resistance: Revolving test for 100 times with a load of 200 g., according to JIS K-6902.

Evaluation:

Good _____ O
Fair _____ △
Worn and peeled off _____ X

TABLE 1

| Experiment No. | 1 1 | 2 | 3 | 4 | 1 5 | 6 | 7 | 8 | 1 9 | 10 | 11 | 12 |
|---|---|---|---|---|---|---|---|---|---|---|---|---|
| Composition, parts by weight: | | | | | | | | | | | | |
| Petroleum resin (A) | 25 | 50 | 75 | 100 | | | | | | | | |
| Petroleum resin (B) | | | | | 25 | 50 | 75 | 100 | | | | |
| Petroleum resin (C) | | | | | | | | | 25 | 50 | 75 | 100 |
| Cyclorubber | 75 | 50 | 25 | | 75 | 50 | 25 | | 75 | 50 | 25 | |
| Gum rosin | | | | | | | | | | | | |
| Coumarone resin | | | | | | | | | | | | |
| Rosin ester gum | | | | | | | | | | | | |
| Hardened rosin | | | | | | | | | | | | |
| Novolak-phenyl resin | | | | | | | | | | | | |
| Evaluation: | | | | | | | | | | | | |
| Adhesive strength [2] | 100 | 80 | 60 | X | 100 | 75 | 60 | X | 100 | 70 | 60 | X |
| Luster | 95 | 90 | 95 | 95 | 95 | 95 | 95 | 95 | 93 | 95 | 95 | 95 |
| Hardness | H | H | H | H | HB | HB | HB | HB | HB | B | B | B |
| Abrasion-resistance | O | △ | X | X | O | △ | X | X | O | X | X | X |

3,533,970

TABLE 1.—CONTINUED

| Experiment No. | 13 | 14 | 15 | 16 | 17 | 18 | 19 | 20 | 21 | 22 | 23 |
|---|---|---|---|---|---|---|---|---|---|---|---|
| Composition, parts by weight: | | | | | | | | | | | |
| Petroelum resin (A) | | | | | | | | | | | |
| Petroleum resin (B) | | | | | | | | | | | |
| Petroleum resin (C) | | | | | | | | | | | |
| Cyclorubber | 100 | 75 | 50 | 75 | 50 | 75 | 50 | 75 | 50 | 75 | 50 |
| Gum rosin | | 25 | 50 | | | | | | | | |
| Coumarone resin | | | | 25 | 50 | | | | | | |
| Rosin ester gum | | | | | | 25 | 50 | | | | |
| Hardened rosin | | | | | | | | 25 | 50 | | |
| Novolak-phenyl resin | | | | | | | | | | 25 | 50 |
| Evaluation: | | | | | | | | | | | |
| Adhesive strength [2] | X | 20 | 26 | 25 | X | 10 | 12 | X | X | 8 | X |
| Luster | 60 | 63 | 70 | 62 | 60 | 63 | 60 | 69 | 73 | 85 | 85 |
| Hardness | B | 2B | 2B | B | B | B | B | B | B | B | B |
| Abrasion-resistance | X | X | X | X | X | X | X | X | X | X | X |

[1] Coating compositions of this invention.
[2] Indicated by numerators while the denominators are 100.

The properties of resins used in the instant example are as follows:

(1) Gum rosin:
    Softening point (Drop-ball), °C. _____ 65–70
    Acid value _____ 176.5
(2) Rosin ester gum:
    Softening point (Drop-ball), °C. _____ 80–84
    Acid value _____ 10.8
(3) Hardened rosin:
    Softening point, °C. _____ 128–130
    Acid value _____ 166.5
(4) Novolak-phenyl resin:
    Softening point, °C. _____ 75–90
    Acid value _____ 20.5
(5) Coumarone resin:
    Softening point, °C. _____ 83–86
    Acid value _____ 3.2

What I claim is:

1. A coating composition for propylene polymer comprising a petroleum resin, a cyclorubber having a softening point of from 40° C. to 60° C. and an iodine number of about 160 to 185 and a solvent therefor, said petroleum resin being a thermoplastic hydrocarbon resin produced by polymerizing the highly unsaturated liquid fraction of petroleum oil containing olefins and diolefins obtained in the cracking of petroleum oil and having a boiling point of 20–280 C. in the presence of a Friedel-Crafts catalyst, said petroleum resin having a softening point of 60–150° C. and a bromine number of 20–60, and said cyclorubber being used in an amount of 0.8–1.2 part by weight per parts of petroleum resin.

2. A coating composition as claimed in claim 1 wherein said petroleum resin is a thermoplastic hydrocarbon resin produced by copolymerizing a fraction containing styrene and styrene derivatives and having a boiling range between about 140 and 280° C. with a fraction containing diolefins and having a boiling range between about 20 and 80° C.

3. A coating composition as claimed in claim 1 and further comprising a colorant.

4. A coating composition as claimed in claim 1 and further comprising dispersing agents.

5. A coating composition as claimed in claim 1 and further comprising thickeners.

6. A coating composition as claimed in claim 1 and further comprising antioxidants.

7. A coating composition according to claim 3 wherein said colorant is selected from the group consisting of rutile type titanium dioxide, ultramarine, zinc white, carbon black, chrome yellow, red oxide, vermillion, phthalocyanine blue, Prussian blue, phthalocyanine green, phthalocyanine red, oil soluble dyestuffs and fluorescent dyes.

8. A process for coating shaped articles of propylene polymer which comprises applying a coating composition comprising a petroleum resin, a cyclorubber having a softening point of from 40° C. to 60° C. and an iodine number of about 160 to 185 and a solvent therefor to a surface of a shaped article of propylene polymer, said petroleum resin being a thermoplastic hydrocarbon resin produced by polymerizing the highly unsaturated liquid fraction of petroleum oil containing olefins and diolefins obtained in the cracking of petroleum oil and having a boiling point of 20–280° C., said cyclorubber being used in an amount of 0.8–1.2 parts by weight per part of petroleum resin.

9. A process as claimed in claim 8 wherein the coating composition further comprises a colorant.

10. A process as claimed in claim 8 wherein the coating composition further comprises dispersing agents.

11. A process as claimed in claim 8 wherein the coating composition further comprises thickeners.

12. A process as claimed in claim 8 wherein the coating composition further comprises antioxidants.

13. A process according to claim 9 wherein said colorant is selected from the group consisting of rutile type titanium dioxide, ultramarine, zinc white, carbon black, chrome yellow, red oxide, vermillion, phthalocyanine blue, Prussian blue, phthalocyanine green, phthalocyanine red, oil soluble dyestuffs and fluorescent dyes.

14. A shaped article of propylene polymer coated with the coating composition as claimed in claim 1.

15. A shaped article of propylene polymer coated with the coating composition as claimed in claim 3.

References Cited

UNITED STATES PATENTS

| 2,398,735 | 4/1946 | Davis et al. | 260—734 |
| 2,413,432 | 12/1946 | Carson | 260—3.3 |
| 3,162,611 | 12/1964 | Varron et al. | 117—138.8 |
| 3,205,093 | 9/1965 | Lynch | 117—138.8 |
| 2,734,046 | 2/1956 | Nelson et al. | 260—82 |

FOREIGN PATENTS

| 393,600 | 6/1933 | Great Britain. |
| 1,090,604 | 11/1967 | Great Britain. |

MURRAY TILLMAN, Primary Examiner

M. J. TULLY, Assistant Examiner

U.S. Cl. X.R.

117—138.8; 260—3.3, 3.5, 4, 23.7, 27, 33.6, 41.5, 82, 734, 889